ent Number: 4,785,082
United States Patent [19]
Weide et al.

[11] Patent Number: 4,785,082
[45] Date of Patent: Nov. 15, 1988

[54] PROCESS FOR PREPARING AN HIGHLY CONCENTRATED AQUEOUS PRESS CAKES OF AN AZO DISPERSE DYE FROM DILUTE AQUEOUS SUSPENSION THEREOF WHEREIN SURFACTANT IS ADDED BEFORE THE DYE IS ISOLATED

[75] Inventors: Joachim Weide; Erwin Dietz, both of Kelkheim; Reinhold Deubel, Bad Soden am Taunus, all of Fed. Rep. of Germany

[73] Assignee: Hoechst Aktiengesellschaft, Frankfurt am Main, Fed. Rep. of Germany

[21] Appl. No.: 795,093

[22] Filed: Nov. 5, 1985

[30] Foreign Application Priority Data

Nov. 6, 1984 [DE] Fed. Rep. of Germany ....... 3440487

[51] Int. Cl.$^4$ .................. C09B 41/00; C09B 67/38; C09B 67/40; C09B 67/54
[52] U.S. Cl. .................. 534/887; 534/581; 534/863
[58] Field of Search ................ 534/887, 581

[56] References Cited

U.S. PATENT DOCUMENTS

3,672,817  6/1972  Falkehag et al. ............ 534/887 X

FOREIGN PATENT DOCUMENTS

| 918145 | 1/1973 | Canada | 534/887 |
|---|---|---|---|
| 0017189 | 10/1980 | European Pat. Off. | 534/887 X |
| 0074670 | 3/1983 | European Pat. Off. | 534/887 |
| 2156603 | 6/1976 | Fed. Rep. of Germany | 534/887 |
| 2421606 | 1/1977 | Fed. Rep. of Germany | 534/887 |
| 2730223 | 1/1979 | Fed. Rep. of Germany | 534/887 |
| 3026127 | 2/1982 | Fed. Rep. of Germany | 534/887 |
| 1265491 | 5/1961 | France | 534/887 |
| 2235728 | 1/1975 | France | 534/887 |
| 2269991 | 5/1975 | France | 534/887 |
| 208477 | 6/1982 | German Democratic Rep. | 534/887 |
| 59-51280 | 3/1984 | Japan | 534/887 |
| 59-91153 | 5/1984 | Japan | 534/887 |
| 88137 | 5/1958 | Netherlands | 534/887 |

OTHER PUBLICATIONS

Kataoka et al., *Chem. Abs.* 93:169620h (1980) (=Japanese Publ. Appl. 80/99,336).
Mitsui Toatsu Chemicals, Inc., *Chem. Abs.* 94:17058p (1981) (=Japanese Pub. Appl. 80/104,358).
Mitsubishi, Chemical Abstracts, vol. 101, 72598c (1984).

*Primary Examiner*—Floyd D. Higel

[57] ABSTRACT

According to the invention, addition of one or more surfactants having a cloud point in aqueous solution to an aqueous suspension of an azo disperse dye gives after the isolation of the dye at a temperature above the cloud point aqueous press cakes containing a large amount of this dye.

The direct processing of press cakes as obtained for example after the synthesis and isolation of azo disperse dyes to practical dispersions for use requires a minimum dye content in the press cakes. The minimum content is frequently not obtained when conventional methods of isolation are used, so that it is necessary to proceed via the indirect route of drying to obtain powders and redispersing the powders. By using the process according to the invention it is possible to cut out the costly indirect route or, if desired, to reduce the expense of drying to obtain powders by an appreciable margin.

18 Claims, No Drawings

PROCESS FOR PREPARING AN HIGHLY CONCENTRATED AQUEOUS PRESS CAKES OF AN AZO DISPERSE DYE FROM DILUTE AQUEOUS SUSPENSION THEREOF WHEREIN SURFACTANT IS ADDED BEFORE THE DYE IS ISOLATED

The invention relates to a process for preparing highly concentrated press cakes of azo disperse dyes.

Many colorants, for example the particularly important azo dyes, are synthesized in an aqueous medium and are isolated from the reaction mixture by filtration or pressoff and, if necessary, are purified by washing away byproducts. The results obtained are press cakes having solids contents of around 10–30%, which subsequently need to be dried or concentrated, since the low solids content of the press cakes does not permit a practical colorant concentration to be obtained in the course of the further processing to disperse dye pastes.

Since the drying or concentrating of aqueous press cakes is very costly in terms of energy, it is desirable to prepare press cakes which are as concentrated as possible. This can be done for example by employing costly hardware in the form of membrane high-pressure filter presses or sieve cone mixers.

However, both the necessary drying and the higher dispersing effort required for dispersing powders are the cause of appreciable expenses. The desire for a simple method of preparing highly concentrated aqueous press cakes is clear from the requirements mentioned and is met by the present invention.

The invention consists in a process for preparing highly concentrated aqueous press cakes of azo disperse dyes, which comprises adding one or more nonionic surfactants which have a cloud point in aqueous solution in the course of the preparation of the respective dye in an aqueous medium, at the latest before the dye is isolated, and isolating the azo disperse dye at a temperature above the cloud point of the surfactant(s) used.

The solids contents of the press cakes obtained depend on the surfactant, on the amount of surfactant, on the dye and more specifically on the surface area of the dye. A suitable nonionic surfactant or surfactant mixture must have a cloud point in aqueous solution and at temperatures above the cloud point substantially lose its hydrophilicity, so that two layers form in water as a result of phase separation. The cloud point of the surfactant(s) in water is preferably between 5° and 90° C., in particular between 20° and 70° C. The stated temperatures are applicable to working under atmospheric pressure. The required amount of surfactant depends on the surface area of the respective dye. The amount is preferably between 0.5 and 15 mg, particularly preferably between 1 and 6 mg, per square meter of surface area of the dye. As a rule, as the amount of surfactant increases, the solids content of the press cakes passes through a maximum. The surfactant can be added at various stages of the process for the preparation of an azo disperse dye. For example, the addition can take place before the azo coupling to the diazonium salt solution or to the solution or suspension of the coupling component. The adiition after the coupling reaction to the coupling suspension is preferred. The distributed addition of the surfactant after one of the measures mentioned is likewise possible. If a dilute aqueous suspension of a disperse dye is already present, the addition of the surfactant needs to take place at the latest before the isolation through filtration or pressoff and the like. With all procedures, the surfactant can be added at a temperature above and below the cloud point. However, preferably the surfactant is added at a temperature below the cloud point and thoroughly mixed.

By stirring the surfactant-containing suspension of the disperse dye is brought to a temperature above the cloud point and the dye is isolated using customary means, for example sucking off or pressing off by means of preheated apparatus.

A further advantage of the process is the possibility that, after the isolation of the dye from the hot reaction mixture, soluble byproducts, for example salts, can be washed away with water at a temperature above the cloud point of the respective surfactant without significantly affecting the surfactant content.

After the highly concentrated press cakes have been cooled down to a temperature below the cloud point, the dispersing properties of the surfactants become fully effective again. Through the action of small shearing forces, for example in the course of stirring, in many cases a relique-faction occurs to give pourable and pumpable pastes having high solids contents. Such pastes having a very high solids content can be economically spray-dried to powders. The liquefaction of the press cakes as a result of cooling and the solidification of the press cakes as a result of heating is reversible.

The process can be carried out with a large number of nonionic surfactants having different structures, provided they meet the condition of having a cloud point in water. Nonionic oxyalkylates of alcohols, fatty alcohols, phenols, alkylphenols, naphthols, alkylnaphthols and fatty amines with ethylene oxide and/or propylene oxide and block polymers of ethylene oxide and propylene oxide have been found to be particularly suitable. The temperature of the cloud point of such compounds depends on the length of the polyalkyleneoxy chain and can be varied in the synthesis of the surfactants by the choice of the amount of ethylene oxide and/or propylene oxide used.

Suitable nonionic surfactants are compounds having a poly(ethyleneoxy) chain or a poly(ethyleneoxy)-poly(methylethyleneoxy) chain which are bonded via an oxygen or nitrogen atom to radicals of the following kind: aliphatic or cycloaliphatic alkyl radicals, primary or secondary alkyl radicals having 6 to 26 carbon atoms, particularly preferably alkyl radicals having 10 to 18 carbon atoms chain length, specifically the nonyl, decyl, undecyl, dodecyl, tridecyl, tetradecyl, pentadecyl, hexadecyl, heptadecyl, octadecyl, 2-butyloctyl, 2-pentyloctyl, 2-hexyldecyl, 2-heptyl-undecyl, 2-octyldodecyl, 2-nonyltridecyl, 2-decyltetradecyl, 10-undecenyl, oleyl, (E)-9-octadecenyl, linoleyl or linolenyl radical; aromatic radicals such as the substituted or unsubstituted phenyl or alkylphenyl radical having up to three primary or secondary alkyl radicals, preferably the hexylphenyl, heptylphenyl, octylphenyl, nonylphenyl, decylphenyl, undecylphenyl, dodecylphenyl, isononylphenyl, tributylphenyl or dinonylphenyl radical, the phenyl radical substituted by further aromatic radicals, such as the benzyl-p-phenylphenyl radical; naphthyl or alkylnaphthyl radicals, preferably the α-naphthyl or β-naphthyl radical or the alkyl-β-naphthyl radical having 1 to 3 unbranched or branched alkyl groups of the type methyl, butyl, octyl, nonyl, decyl, dodecyl or tetradecyl; optionally alkyl-substituted heterocyclic radicals or alkyl radicals substituted thereby, such as, for example, the 2-[2-(8-heptadecen-1-yl)-4,5-dihydro-1-imidazolyl]ethyl radical.

Preference is also given to mixtures of the abovementioned compounds and in particular mixtures as obtained in the oxyalkylation with ethylene oxide and/or propylene oxide of synthetic fatty alcohols from the oxo synthesis or of fatty alcohols from natural raw materials (after fat splitting and reduction). Examples of natural raw materials are coconut oil, palm oil, cotton seed oil, sunflower oil, soybean oil, linseed oil, rape seed oil, tallow and fish oil. Also suitable are corresponding fatty amine oxyalkylates from these natural raw materials, in particular cocoa fatty amine, tallowamine and oleylamine.

Also to be mentioned are oxyalkylated, higher-molecular surface-active assistants (surfactants) as described for example in the following patents, Offenlegungsschriften and Auslegeschriften, except those surfactants which have no cloud point in aqueous solution: DE-A1-2,730,223, DT-B2-2,156,603, DE-A1-3,026,127, DT-B2-2,421,606 and EP-A1-0,017,189.

Which surfactant is used depends on the specific product and on the intended use for the highly concentrated press cakes or powders obtained according to the invention.

Compared with the conventional processes for preparing aqueous press cakes of azo disperse dyes, the use of the process according to the invention gives an improved space-time yield in the filtration of the dyes, a saving in drying expenses and a reduced dispersing effort in the processing of the highly concentrated prefinished press cakes to aqueous dye dispersions. The disperse dye preparations which are obtained on further processing the press cakes prepared according to the invention are as suitable as conventionally prepared dye preparations for dyeing natural and synthetic materials.

In the following examples parts and percentages are by weight, unless otherwise stated. Parts by weight relate to parts by volume as the kilogram relates to the liter. The cloud points were determined in accordance with DIN 53917.

EXAMPLE 1

153 parts of N-(p-methoxyphenyl)-2-hydroxy-3-naphthamide were dissolved in 1550 parts of water by addition of 121.5 parts of 33% strength sodium hydroxide solution. To this solution were added 20 parts of nonylphenolpolyglycol ether having a cloud point in water of 32°-34°C. To this coupling component solution was added at a temperature between +2° C. and +7° C., while adding 1250 parts of ice, a solution of 69.75 parts of phenyldiazonium chloride prepared in conventional manner. After the coupling had ended, the solution was brought to pH 7 with dilute hydrochloric acid. Thereafter was present a dye suspension of 196 parts of C.I. Disperse Orange 42 (BET specific surface area: 54.5 m$^2$/g) in a coupling volume of 4500 parts, which was heated with direct steam to 80°-85° C. while stirring, was sucked at this temperature through a nutsche filter and was washed with hot water at 50°-60° C. until salt-free. The dye press cake obtained had a solids content of 46%. After addition of an anionic dispersant of the ligninsulfonate type, it was possible to prepare from this press cake, by stirring with a dissolver and brief dispersing in a bead mill, a disperse dye paste having good dyeing properties.

COMPARATIVE EXAMPLE

The example was repeated without addition of the surfactant. The result obtained was a dye press cake having a solids content of 15.5%.

EXAMPLE 2

153 parts of N-(p-methoxyphenyl)-2-hydroxy-3-naphthamide were dissolved in 1550 parts of water by addition of 121.5 parts of 33% strength sodium hydroxide solution. To this coupling component solution was added at a temperature between +2° C. and +7° C., while adding 1250 parts of ice, a solution of 69.75 parts of phenyldiazonium chloride prepared in conventional manner and 20 parts of a nonylphenolpolyglycol ether having a cloud point in water of 32°-34° C. After the coupling had ended, the solution was brought to pH 7 with dilute hydrochloric acid. The temperature was then raised to 80°-85° C. with direct steam, which was followed by passing at this temperature through a nutsche filter and washing with hot water at 50°-60° C. until salt-free. The resultant 507 parts of press cake of C.I. Disperse Orange 42 had a solids content of 42.6%.

EXAMPLE 3

153 parts of N-(p-methoxyphenyl)-2-hydroxy-3-naphthamide were dissolved in 1550 parts of water by addition of 121.5 parts of 33% strength sodium hydroxide solution. To this coupling component solution was added at a temperature between +2° C. and +7° C., while adding 1250 parts of ice, a solution of 69.75 parts of phenyldiazonium chloride prepared in conventional manner. After the coupling had ended, the coupling suspension had added to it 20 parts of nonylphenolpolyglycol ether having a cloud point in water of 32°-34° C. and was brought to pH 7 with dilute hydrochloric acid. The temperature was then raised to 80°-85' C. with direct steam, which was followed by passing at this temperature through a nutsche filter and washing with hot water at 50°-60° C. until salt-free. The resultant 374 parts of press cake of C.I. Disperse Orange 42 had a solids content of 57.8%.

EXAMPLE 4

Coupling was used to prepare a dye suspension of 800 parts of C.I. Disperse Yellow 227 (BET specific surface area: 23.2 m$^2$/g) in a coupling volume of 22,000 parts. To this dye suspension were added at 22° C. 80 parts of benzyl-p-phenylphenol polyglycol ether having a cloud point in the mother liquor of 60°-62° C., and the mixture was thoroughly stirred. The temperature was then raised to 85° C. while stirring, and at this temperature the dye was isolated via a filter press. It was then washed with hot water at 70°-75° C. until neutral and salt-free and was blown dry with air in the course of 10 minutes. The resultant dye press cake had a solids content of 41.4%. It was possible to process a press cake prepared in this way in a third of the dispersing time required for an untreated press cake to a practical disperse dye paste having good dyeing properties.

COMPARATIVE EXAMPLE

The example was repeated without addition of the surfactant. The result obtained was a press cake having a solids content of 23.7%.

EXAMPLE 5

Example 4 was repeated, except that instead of 80 parts of benzyl-p-phenylphenol polyglycol ether 80 parts of tributylphenol polyglycol ether having a cloud point in water of 62°–64° C. were added, affording a press cake having a solids content of 41.2% which, after cooling down to 25° C., could be readily liquefied without further additives by means of a dissolver to give a fluent and pumpable paste.

EXAMPLE 6

Example 4 was repeated, except that instead of 80 parts of benzyl-p-phenylphenol polyglycol ether 80 parts of a polymerization product of propylene oxide and ethylene oxide having a cloud point in water of 55° C. were added, affording a dye press cake having a solids content of 39%.

EXAMPLE 7

Coupling was used to prepare a dye suspension of 800 parts of C.I. Disperse Yellow 227 in a coupling volume of 22,000 parts. To this dye suspension were added at 12° C. 40 parts of a $C_{10}$-fatty alcohol/ethylene oxide/propylene oxide adduct having a cloud point in water of 18°–20° C. and 40 parts of a natural resin acid/ethylene oxide adduct having a cloud point in water of 40°–42° C., and the mixture was thoroughly stirred. The temperature was then raised while stirring to 60° C., and at this temperature the dye was isolated via a filter press. It was then washed with hot water at 55° C. until neutral and salt-free and was blown dry with air in the course of 10 minutes. The resultant press cake had a solids content of 38.4%.

We claim:

1. A process for preparing a highly concentrated aqueous press cake of an azo disperse dye, which comprises adding one or more surfactants which have a cloud point in aqueous solution in the course of the preparation of the respective dye in an aqueous medium, at the latest before the dye is isolated, and isolating the azo disperse dye at a temperature above the cloud point of the surfactant or surfactants used.

2. The process as claimed in claim 1, wherein the surfactant or the surfactant mixture is added at a temperature below the cloud point thereof to at least one of the following solutions or suspensions: The diazonium salt solution, the solution or suspension of coupling component or the coupling suspension after the coupling reaction has ended.

3. The process as claimed in claim 1, wherein the nonionic surfactant or surfactant mixture has a cloud point in water between 5° and 90° C.

4. The process as claimed in claim 1, wherein the nonionic surfactant or surfactant mixture has a cloud point in water between 20° and 70° C.

5. The process as claimed in claim 1, wherein 0.5 to 15 mg of surfactant is used per square meter of dye surface area.

6. The process as claimed in claim 1, wherein 1 to 6 mg of surfactant is used per square meter of dye surface area.

7. The process as claimed in claim 1, wherein the nonionic surfactants used are block polymers of ethylene oxide and propylene oxide.

8. The process as claimed in claim 1, wherein the nonionic surfactants used are oxyalkylates of aliphatic hydroxy or amino compounds.

9. The process as claimed in claim 1, wherein the nonionic surfactants used are oxyalkylates of aromatic, cycloaliphatic or heterocyclic hydroxy or amino compounds.

10. The process as claimed in claim 1, wherein the press cake obtained above the cloud point is liquefied below the cloud point through the action of shearing forces.

11. The process as claimed in claim 2, wherein the surfactant or surfactant mixture has a cloud point in water between 20° and 70° C.

12. The process as claimed in claim 2, wherein 0.5 to 15 mg of the surfactant is used per square meter of dye surface area.

13. The process as claimed in claim 2, wherein 1 to 6 mg of surfactant is used per square meter of dye surface area.

14. The process as claimed in claim 12, wherein the surfactant or the surfactant mixture has a cloud point in water between 20° and 70° C.

15. The process as claimed in claim 11, wherein 1 to 6 mg of surfactant is used per square meter of dye surface area.

16. The process as claimed in claim 1, wherein, after the isolation of the dye, water soluble byproducts are washed therefrom at a temperature above the cloud point of the surfactant or surfactants.

17. A process for the preparing a highly concentrated aqueous press cake of an azo disperse dye by isolation from a relatively dilute aqueous medium, which comprises (a) adding to an aqueous solution or suspension medium which is utilized in the course of the azo disperse dye preparation process, prior to the isolation of the azo disperse dye, a surfactant or mixture of surfactants having a cloud point in water between 5° and 90° C., said surfactant or mixture of surfactants being added at a temperature below the cloud point of the relatively dilute aqueous medium, (b) heating the resulting aqueous suspension of the azo disperse dye, said suspension now containing said surfactant or mixture of surfactants, to a temperature above said cloud point, and isolating the azo disperse dye while maintaining the temperature above said cloud point, and (c) recovering the concentrated press cake comprising azo disperse dye.

18. The process as claimed in claim 17, wherein the concentrated press cake thus recovered is dispersed to form a disperse dye paste.

* * * * *